(12) United States Patent
Whiteman et al.

(10) Patent No.: US 11,626,632 B2
(45) Date of Patent: Apr. 11, 2023

(54) REVERSIBLE THERMAL MANAGEMENT SYSTEM AND METHOD FOR A WORK MACHINE

(71) Applicant: DEERE & COMPANY, Moline, IL (US)

(72) Inventors: Steven R. Whiteman, Asbury, IA (US); Zakir H. Faruquee, Asbury, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/949,490

(22) Filed: Oct. 30, 2020

(65) Prior Publication Data

US 2022/0140413 A1     May 5, 2022

(51) Int. Cl.

| | |
|---|---|
| *H01M 10/63* | (2014.01) |
| *H01M 10/6568* | (2014.01) |
| *H01M 10/625* | (2014.01) |
| *H01M 10/48* | (2006.01) |
| *B60L 58/26* | (2019.01) |
| *B60L 58/27* | (2019.01) |
| *F25B 7/00* | (2006.01) |
| *H01M 10/66* | (2014.01) |

(52) U.S. Cl.
CPC ............ *H01M 10/63* (2015.04); *B60L 58/26* (2019.02); *B60L 58/27* (2019.02); *F25B 7/00* (2013.01); *H01M 10/486* (2013.01); *H01M 10/625* (2015.04); *H01M 10/6568* (2015.04); *H01M 10/66* (2015.04); *B60L 2240/545* (2013.01); *H01M 2220/20* (2013.01)

(58) Field of Classification Search
CPC .. H01M 10/63; H01M 10/486; H01M 10/625; H01M 10/6568; H01M 10/66; H01M 2220/20; B60L 58/26; B60L 58/27; B60L 2240/545; F25B 7/00
See application file for complete search history.

(56) References Cited

U.S. PATENT DOCUMENTS

| | | | |
|---|---|---|---|
| 10,655,040 B2 | 5/2020 | Close et al. | |
| 2001/0040061 A1* | 11/2001 | Matuda | B60W 10/30 165/41 |
| 2016/0039309 A1* | 2/2016 | Gale | H01M 8/04074 165/104.31 |
| 2019/0016231 A1* | 1/2019 | Scaringe | B60L 1/003 |
| 2021/0031588 A1* | 2/2021 | Yahia | F25B 49/02 |
| 2021/0318037 A1* | 10/2021 | Rached | C09K 5/045 |

FOREIGN PATENT DOCUMENTS

| | | |
|---|---|---|
| EP | 3499634 A1 | 6/2019 |
| FR | 3025297 A1 | 3/2016 |
| WO | WO2019086837 A1 | 5/2019 |
| WO | WO2019158857 A1 | 8/2019 |

\* cited by examiner

*Primary Examiner* — Adam A Arciero

(57) ABSTRACT

A reversible thermal management system and method for a work machine is disclosed. The system comprises a prime mover, a battery, a first circuit, and a second circuit. The battery supplies at least a portion of power of the prime mover. The first circuit circulates a glycol adapted to exchange thermal energy with one or more of an electronic component, a transmission circuit, a hydraulic circuit and the battery. The second circuit circulates a refrigerant. The second circuit, which is thermally coupled to the first circuit by at least one heat exchanger, is adapted to exchange thermal energy with air.

7 Claims, 4 Drawing Sheets

REVERSIBLE THERMAL MANAGEMENT SYSTEM AND METHOD FOR A WORK MACHINE

CROSS-REFERENCE TO RELATED APPLICATIONS

N/A

FIELD OF THE DISCLOSURE

The present disclosure relates to a reversible thermal management system and method for a work machine.

BACKGROUND

With the interest of energy saving and eco-friendlier products growing, vehicles of hybrid and electric form have become more prevalent in the automobile industry and have now crossed over into work machines. However, heavy workload actions such as excavation, load carrying, and carving of the ground surface require large amounts of power. With energy saving products, power efficiency and the refinement of power consumption become essential in balancing a work machine's size and function where increased power usage require ever increasing sized batteries. Therein lies a need for optimizing systems for energy resources, including thermal management of the work machine by reducing size, weight, and efficiency.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a reversible thermal management system and method for a work machine. The system comprises a prime mover, a battery, a first circuit, and a second circuit. The battery supplies at least a portion of power of the prime mover. The first circuit circulates a glycol adapted to exchange thermal energy with one or more of an electronic component, a transmission circuit, a hydraulic circuit and the battery. The second circuit circulates a refrigerant. The second circuit, which is thermally coupled to the first circuit by at least one heat exchanger, is adapted to exchange thermal energy with air.

The system may also comprise a cooling operation mode, and a heat exchanger. The cooling operation mode includes one or more of the electronic component, a transmission circuit, a hydraulic circuit, and the battery. During this mode thermal energy is absorbed by the glycol within the first circuit. The heat exchanger operates as an evaporator to release thermal energy to the refrigerant within the second circuit. The second circuit releases thermal energy to air through a condenser.

The system may also comprise a heating operation mode for heating one or more of the electronic components, a transmission circuit, a hydraulic circuit, and the battery. During the heating operation mode, thermal energy is absorbed by the refrigerant in the second circuit. The heat exchanger operates as a condenser to release thermal energy to the glycol within the first circuit. The second circuit absorbs thermal energy from the air through an evaporator.

A thermal storage unit may also couple to one or more of the first circuit and the second circuit. The thermal storage unit absorbs thermal energy during the cooling operation mode and releases thermal energy during the heating operation mode.

The first circuit comprises of a first gear pump that circulates the glycol in the first circuit. The second circuit comprises a second gear pump that circulates the refrigerant in the second circuit. The first gear pump and the second gear pump each comprise of a drive motor wherein the drive motor directs a direction of flow. A controller is adapted to send a flow signal to the drive motor to control the direction of flow based on a temperature of one or more of the electronic component, a transmission circuit, a hydraulic circuit, and the battery. The controller may also be adapted to send a flow signal to the drive motor to control the magnitude of flow.

In a reversible thermal management method for a work machine, the method comprises receiving a temperature signal by a controller from a thermal sensor, analyzing the temperature signal by the controller, determining a mode by the controller, sending a flow signal based on the mode by the controller to each drive motor coupled to a first gear pump and a second gear pump, and circulating the fluid in the direction of flow determined. The thermal sensor measures the temperature of one or more of an electronic component, transmission circuit, hydraulic circuit, and a battery on the work machine. The mode includes a cooling operation mode and a heating operation mode. The flow signal directs a direction of flow of a fluid in one more of a first circuit and a second circuit using one or more of the first gear pump and the second gear pump.

In another aspect of the method, the first circuit may circulate a glycol adapted to exchange thermal energy with one or more of the electronic components, transmission circuit, hydraulic circuit, and the battery. The second circuit, thermally coupled to the first circuit by at least one heat exchanger, circulates a refrigerant adapted to exchange thermal energy with air.

The cooling operation mode may include absorbing thermal energy by the glycol in the first circuit and releasing thermal energy by the glycol to the refrigerant in the second circuit through a heat exchanger operating as an evaporator. The method may include releasing thermal energy by the refrigerant to air through a evaporator.

The heating operation mode may include absorbing thermal energy from air by the refrigerant in the second circuit and releasing thermal energy to the glycol within the first circuit through a heat exchanger operating as a condenser.

The method may further include absorbing thermal energy from a thermal storage unit coupled to one or more of the first circuit and the second circuit during a cooling operation mode and releasing thermal energy unit during a heating operation mode.

A flow signal may further adjust a rate of flow of the fluid from one or more of the first circuit and the second circuit.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller 215 may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
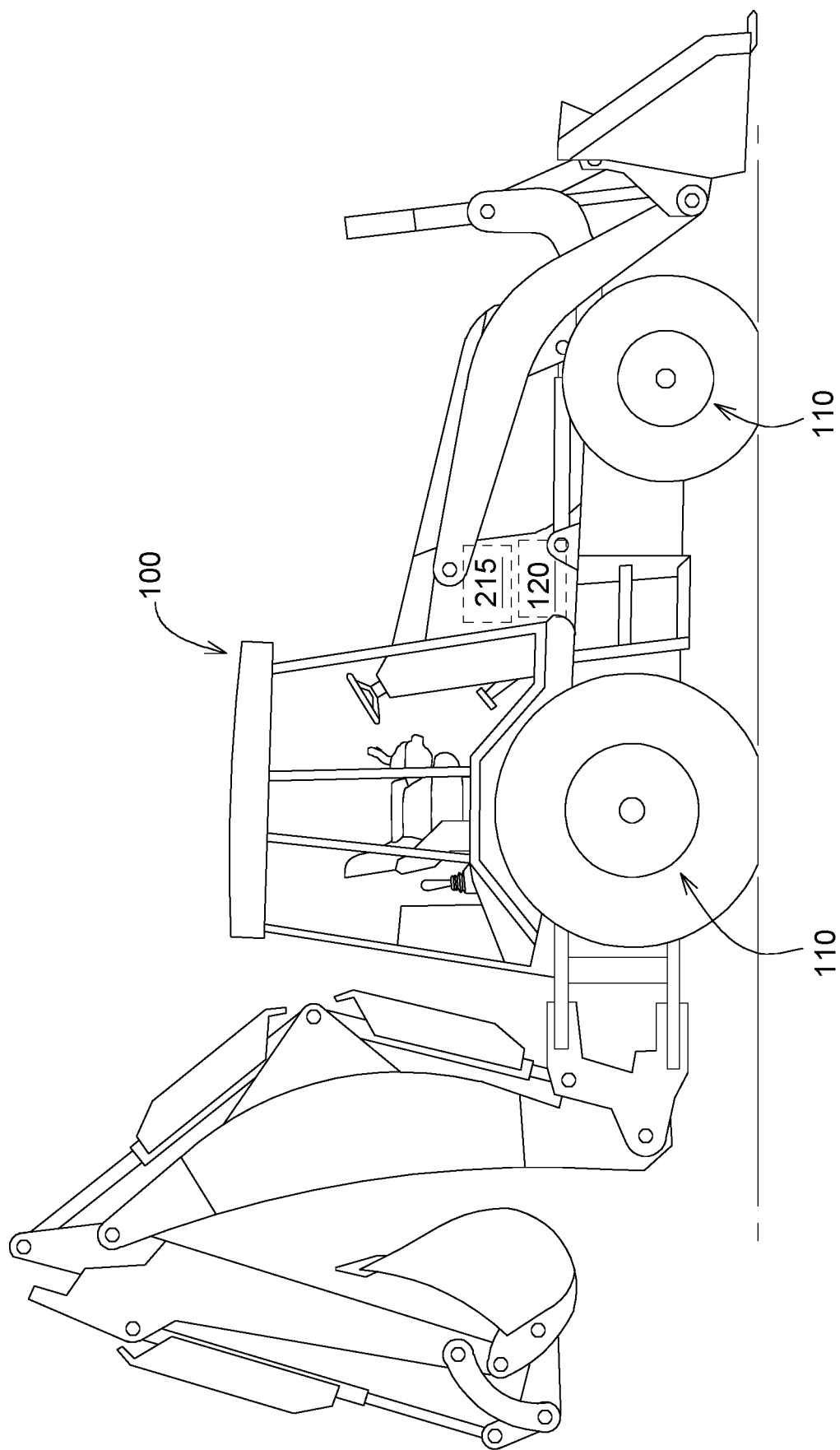
FIG. 1 is a side view of a work machine according to one embodiment.
Figure 2:
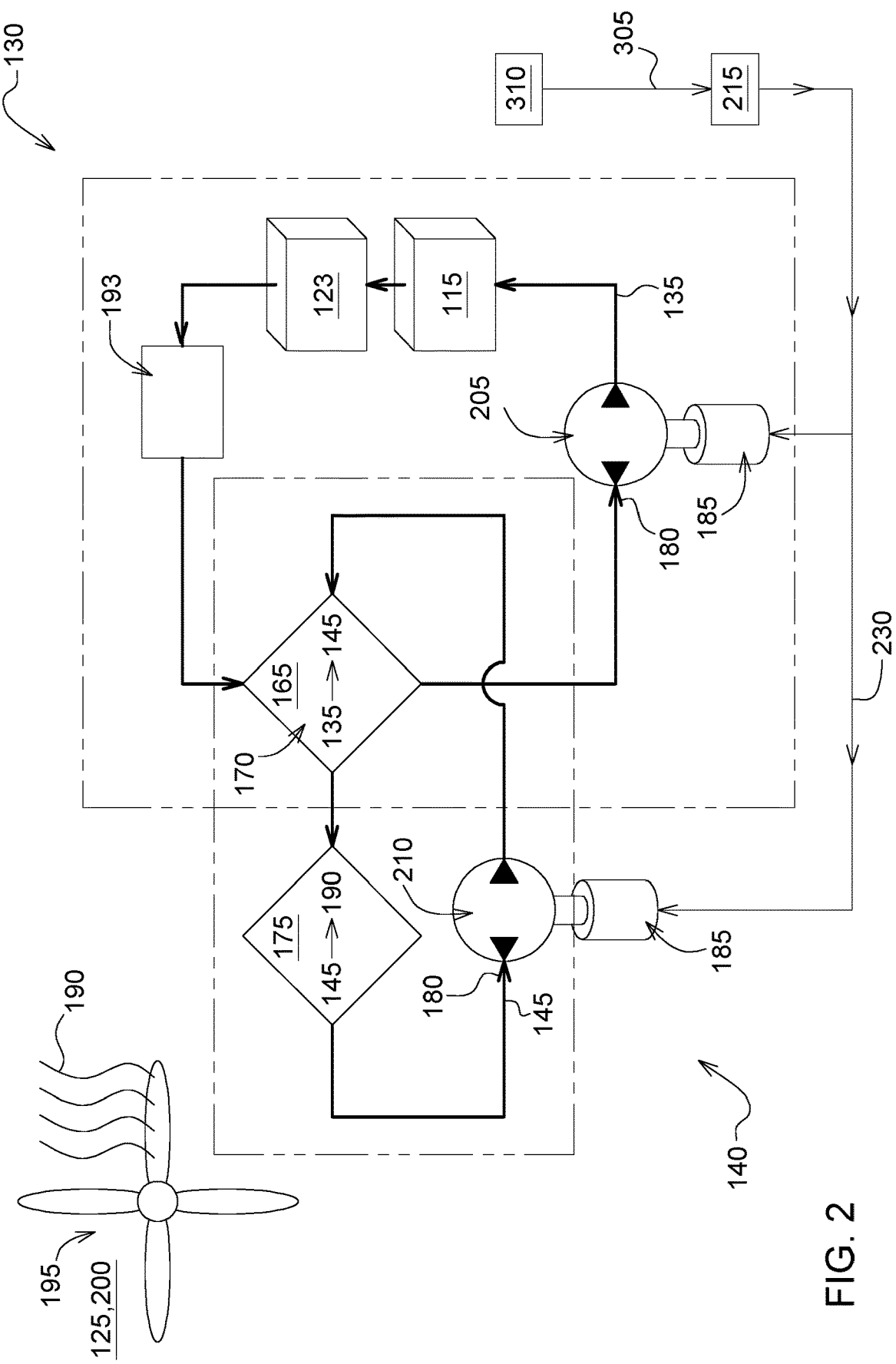
FIG. 2 is a schematic of the reversible thermal management system cooling components of the work machine.
Figure 3:
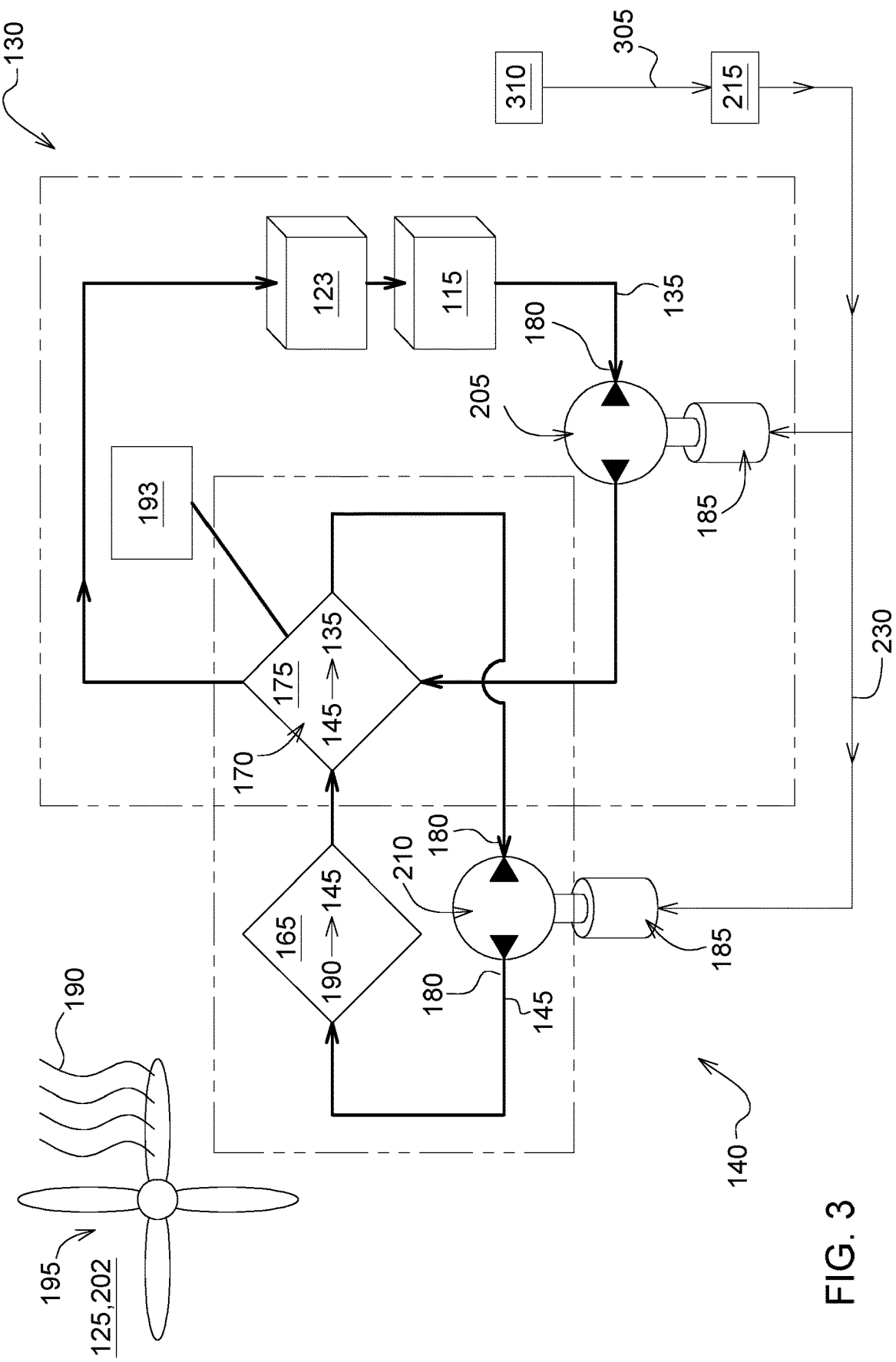
FIG. 3 is a schematic of the reversible thermal management system heating components of the work machine.

FIG. 1 illustrates an exemplary work machine 100, the backhoe loader, having a reversible thermal management system 125. FIGS. 2 and 3 are high-level schematics of the reversible thermal management system 125 as it relates to the present embodiment.

The work machine 100 has a frame 105, to which are coupled a ground-engaging mechanism 110 for supporting and propelling the work machine 100. Electric work machines and hybrid work machines may require a reconfiguration of work machine components 123 (hereinafter referred to also as electronic component, a transmission circuit, a hydraulic circuit and a reallocation of space for each respective component, as compared to conventional work machines. The battery 115 size for work machines engaging in heavy workloads are generally relatively large, and difficult to simply "tack on" to existing components. The following discloses a reversible thermal management system 125 advantageously optimizing the space required for thermal management. For example, the system 125 enables elimination of the compressor, a component commonly found in thermal management systems. Removal of the compressor opens space that would otherwise be unavailable, and further lightens the load on the work machine. Additionally, the reversibility of flow 180 enables the system 125 to operate either in a cooling operation mode 200 or a heating operation mode 202.

The reversible thermal management system 125 comprises of a prime mover 120, a battery 115 that supplies at least a portion of the prime move 120r, a first circuit 130, and a second circuit 140.

The prime mover 120 includes any power source to provide rotational driveline power and/or power to the hydraulic system. For example, the prime mover 120 may include, but is not limited to, an internal combustion engine, a piston engine, a rotary engine, a hydraulic motor, a hydrostatic system, an electric motor, etc. In a hybrid configuration, the battery 115 may supply at least a portion of power of the prime mover 120. In a pure electric configuration, the battery 115 may be the primary source of power for an electric motor on the prime mover 120.

The first circuit 130 circulates a glycol 135 adapted to exchange thermal energy with one or more of a work machine component 123 of the work machine 100 and the battery 115. However, other alternatives may include other fluids (e.g. oil).

The second circuit 140, circulating a refrigerant 145 and coupled to the first circuit 130 by at least one heat exchanger 170, is also be adapted to exchange thermal energy with ambient air 190. The liquid-to-liquid heat exchanger 170 transfers thermal energy between the first circuit 130 and the second circuit 140. In hot environments, the reversible thermal management system 125 may be used to absorb thermal energy from one or more of the battery 115 and work machine components 126, and release the thermal energy to ambient air 190. In cold environments, the reversible thermal management system 125 reverses flow 180 (as indicated by arrows) to warm one or more of the battery 115 and work machine components from thermal energy drawn from ambient air 190.

FIG. 2 demonstrates the reversible thermal management system 125 in a cooling operation mode 200 for cooling the battery 115 and work machine components 123. During the cooling operation mode 200, thermal energy is absorbed by the glycol 135 within the first circuit 130. In cooling operation mode 200, the heat exchanger 170 operates as an evaporator 165 to release thermal energy from the glycol 135 to the refrigerant 145 in the second circuit 140. Subsequently, the second circuit 140 releases thermal energy to ambient air 190 through a condenser 175.

The system 125 further comprises a heating operation mode 202 for heating one or more of the work machine components 123 and the battery 115. During the heating operation mode 202 thermal energy is absorbed by the refrigerant 145 from air 190 in the second circuit 140. The second circuit 140 absorbs thermal energy from the air 190 through an evaporator 165. In the heating operation mode 202, the heat exchanger 170 operates as a condenser 175 to release thermal energy to the glycol 135 within the first circuit 130.

The system 125 may also include a thermal storage unit 193 thermally coupled to one or more of the first circuit 130 and the second circuit 140. The thermal storage unit 193 may absorb thermal energy during the cooling operation mode 200 and release previously removed thermal energy from the cooling operation mode 200 during the heating operation mode 202.

The first circuit 130 comprising a glycol 135, and the second circuit 140 comprising the refrigerant 145, each have their own respective gear pump (205, 210). Gear pumps, in the present embodiment, are driven by motors (185) to facilitate movement of liquids through the circuits through either physical or mechanical action. Advantageously, each gear pump (205, 210) can reverse the direction of flow 180 by changing the direction of the drive motor 185. The reversible flow feature is not possible with conventional thermal management systems that include compressors and centrifugal water pumps. Furthermore, reversibility is not possible with gas mediums. The glycol gear pump 205 (i.e. the gear pump directing flow 180 of the glycol 135 through the first circuit 130) is able to generate output pressures up to ten times higher than traditional water pumps, thereby allowing a more extensive travel path for the first circuit 130. The gear pumps (205, 210) have at least two ports, a first port for liquid influx and a second port for liquid outflux.

Additionally, the second circuit 140 comprising a refrigerant gear pump 210 operates at a lower pressure compared to conventional thermal management systems. The lower operating pressure advantageously reduces the power required to operate the system, thereby enabling a lower cost gear pump component to circulate the refrigerant.

Figure 4:
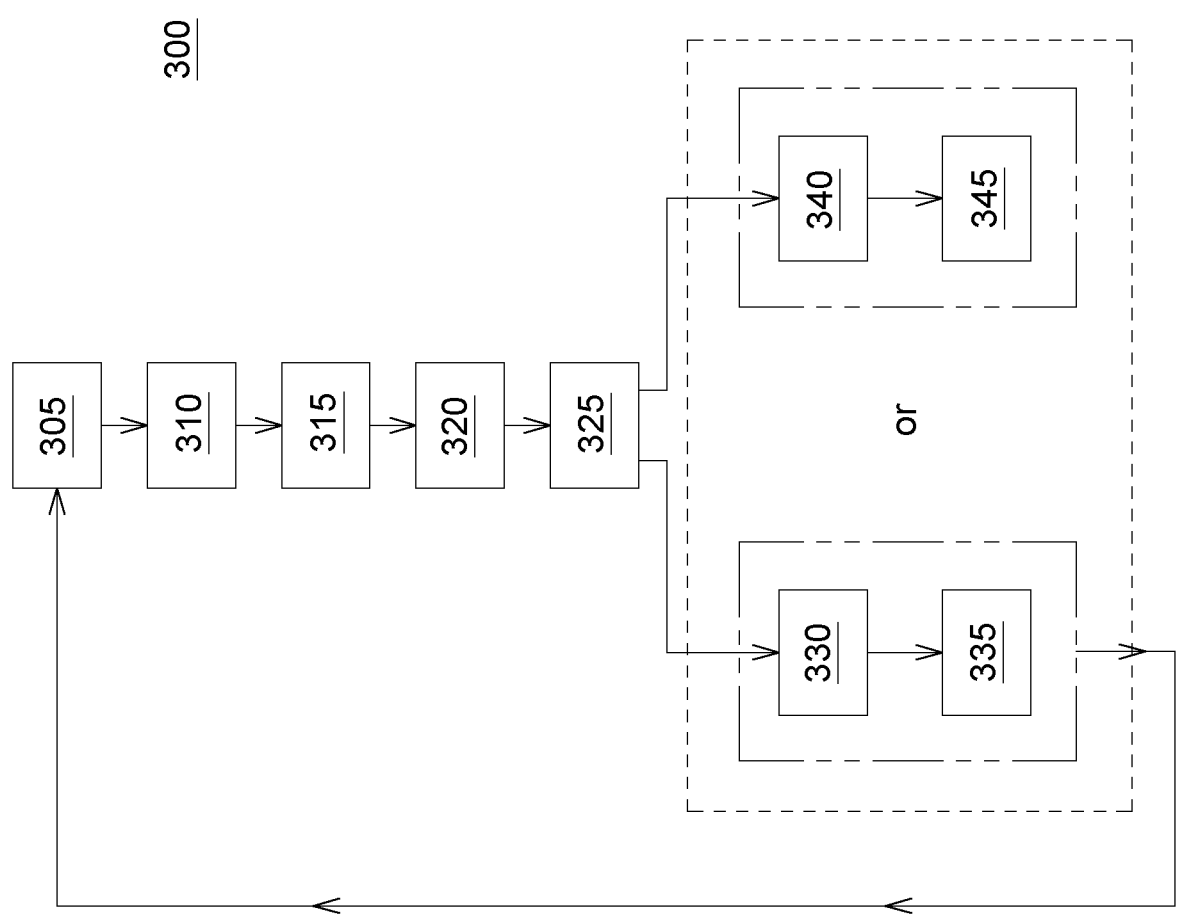
FIG. 4 is a flowchart of the method of a reversible thermal management system.

FIG. 4 illustrates a method/process of operating a reversible thermal management system 300 (hereinafter also referred to as a thermal management process 300) for a work machine, which may be implemented in one or more of the embodiments described herein and depicted in the various FIGURES. The method 300 may also apply to any work machine 100 requiring management of thermal energy wherein the work machine 100 includes one or more of a prime mover 120 and a battery 115. The thermal management process 300 includes a number of process STEPS 305, 310, 315, 320, 325, 330, 335, 340, 345, and 350 each of which is described, in turn, below. Depending upon the particular manner in which the thermal management process 300 is implemented, each step generically illustrated in FIG. 4 may entail a single process or multiple sub-processes. Further, the steps illustrated in FIG. 4 and described below are provided by way of non-limiting example only. In alternative embodiments of the thermal management process 300, additional process steps may be performed, certain steps may be omitted, and/or the illustrated process steps may be performed in alternative sequences. At step 305, the method starts.

At step 305, the controller 215 receives a temperature signal from a thermal sensor 225 of one or more of an electronic component, a transmission circuit, a hydraulic circuit (represented by 123), and the battery 115 on the work machine.

At step 310, the controller 215 analyzes the temperature signal 220.

At step 315, the controller 215 then determines a mode of operation wherein the mode includes a cooling operation mode 200 and a heating operation mode 202.

At step 320, the controller 215 sends a flow signal 230 based on the mode identified to each respective drive motor 185. That is a drive motor 185 for first gear pump 205 and a drive motor 185 for the second gear pump 210. The flow signal 230 directs a direction of flow of a fluid in one or more of a first circuit 130 and a second circuit 140 using one or more of the first gear pump 205 and the second gear pump 210. The flow signal 230 further adjusts the rate and/or magnitude of the flow of fluid from one or more of the first circuit and the second circuit.

At step 325, the method includes circulating the fluid in the direction of flow in one or more of the first circuit and the second circuit based on the flow signal. In the first circuit, the fluid is a glycol adapted to exchange thermal energy with one or more of an electronic component, a transmission circuit, a hydraulic circuit 123 and the battery 115. In the second circuit 140, which is thermally coupled to the first circuit 130, by at least one heat exchanger 170, the fluid is a refrigerant 145 adapted to exchange thermal energy with air.

If the controller 215 determines to proceed in a cooling operation mode 200, at step 330 the first circuit 130 absorbs thermal energy by the glycol 135, and subsequently at step 335 release the thermal energy in the glycol 135 to a refrigerant 145 in the second circuit 140 through a heat exchanger 170 operating as an evaporator 165. The refrigerant 145 releases this thermal energy to air through a condenser 175.

Alternatively, if the controller 215 determines to proceed in a heating operation mode 202, at step 340 the refrigerant 145 in the second circuit 140 absorbs thermal energy from air, and at step 345 subsequently release thermal energy to the glycol 135 within the first circuit 130 through a heat exchanger 170 operating as an evaporator 165. The glycol 135 releases this thermal energy to one or more of the electronic component, a transmission circuit, a hydraulic circuit 123 and the battery 115 through an evaporator At step 350, when maintaining a fluid temperature within a range, a thermal storage unit 193 coupled to one or more of the first circuit 130 and the second circuit 140, will absorb thermal energy during the cooling operation mode 200, and release thermal energy during a heating operation mode 202.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A reversible thermal management system for a work machine, the system comprising:
   a prime mover;
   a battery that supplies at least a portion of a power of the prime mover
   a first circuit having a first gear pump for circulating a glycol adapted to exchange thermal energy with one or more of an electronic component, a transmission circuit, a hydraulic circuit and the battery of the work machine; and
   a second circuit having a second gear pump for circulating a refrigerant, the second circuit thermally coupled to the first circuit by at least one heat exchanger, the second circuit adapted to exchange thermal energy with air;

wherein during a cooling operation mode the glycol absorbs the thermal energy, the glycol circulating in a first glycol direction, and the heat exchanger operating as an evaporator to release the thermal energy from the glycol to the refrigerant circulating in a first refrigerant direction, and wherein during a heating operation mode the refrigerant absorbs the thermal energy, the refrigerant circulating reverse of the first refrigerant direction, and the heat exchanger operating as a condenser to release thermal energy from the refrigerant to the glycol circulating reverse of the first glycol direction.

2. The system of claim 1, wherein the second circuit releases thermal energy to air through a condenser.

3. The system of claim 1, wherein the second circuit absorbs thermal energy from the air through an evaporator.

4. The system of claim 1 further comprising:

a thermal storage unit thermally coupled to one or more of the first circuit and the second circuit, the thermal storage unit absorbing thermal energy during a cooling operation mode and releasing thermal energy during a heating operation mode.

5. The system of claim 1, wherein the first gear pump and the second gear pump each comprise a drive motor, the drive motor directing a magnitude of flow.

6. The system of claim 1, wherein the first gear pump and the second gear pump each comprise a drive motor, the drive motor directing a direction of flow.

7. The system of claim 6 further comprising a controller coupled to the first gear pump and the second gear pump, the controller adapted to send a flow signal to the drive motor to control the direction of flow based on a temperature of one or more of the electronic component, a transmission circuit, a hydraulic circuit, and the battery.

\* \* \* \* \*